United States Patent
Bhardwaj et al.

(10) Patent No.: US 10,878,467 B1
(45) Date of Patent: Dec. 29, 2020

(54) SYSTEMS AND METHODS FOR DISTRIBUTION OF ENTERPRISE SOFTWARE AND COMPENSATION FOR USAGE OF THE ENTERPRISE SOFTWARE

(71) Applicant: Instabase, Inc., San Francisco, CA (US)

(72) Inventors: Anant Bhardwaj, San Francisco, CA (US); Shih Ping Chang, San Francisco, CA (US); Justin Herlick, San Francisco, CA (US)

(73) Assignee: Instabase, Inc., San Francisco, CA (US)

( * ) Notice: Subject to any disclaimer, the term of this patent is extended or adjusted under 35 U.S.C. 154(b) by 0 days.

(21) Appl. No.: 16/940,919

(22) Filed: Jul. 28, 2020

(51) Int. Cl.
| | |
|---|---|
| *G06Q 30/00* | (2012.01) |
| *G06Q 30/02* | (2012.01) |
| *G06Q 20/14* | (2012.01) |
| *G06F 3/0484* | (2013.01) |

(52) U.S. Cl.
CPC ....... *G06Q 30/0283* (2013.01); *G06Q 20/145* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 7,289,964 B1 * | 10/2007 | Bowman-Amuah | G06F 9/5038 705/1.1 |
| 7,865,442 B1 * | 1/2011 | Sowell | G06Q 50/184 705/59 |
| 2005/0183143 A1 * | 8/2005 | Anderholm | G06F 11/3438 726/22 |
| 2011/0022846 A1 * | 1/2011 | Ginter | G06Q 30/0273 713/176 |
| 2013/0066770 A1 * | 3/2013 | Das | G06Q 20/145 705/39 |
| 2014/0089890 A1 * | 3/2014 | Martin | H04L 12/1813 717/105 |
| 2014/0282016 A1 * | 9/2014 | Hosier, Jr. | G06Q 50/01 715/733 |
| 2015/0142649 A1 * | 5/2015 | Rathod | G06F 16/275 705/40 |
| 2015/0312422 A1 * | 10/2015 | Leemet | H04L 12/1435 455/406 |
| 2016/0182707 A1 * | 6/2016 | Gabel | G06F 3/0482 455/404.2 |

OTHER PUBLICATIONS

Mueller, Henrik, "Capacity Planning as a Service for Enterprise Standard Software" Aug. 14, 2017, 2017 IEEE 19th Conference on Business Informatics (CBI) (vol. 01, pp. 167-175) (Year: 2017).*

* cited by examiner

*Primary Examiner* — Oluseye Iwarere
(74) *Attorney, Agent, or Firm* — Esplin & Associates, PC

(57) ABSTRACT

Systems and methods for distribution of enterprise software and compensation for usage of the enterprise software are disclosed. Exemplary implementations may: store information including executable code of software applications; receive user input from administrative users regarding eligibility of individual software applications for different users; facilitate execution of different eligible software applications as selected by the different users; monitor billable execution of the software applications; determine compensation amounts that correspond to monitored billable execution; and presenting information to a given administrative user regarding the determined compensation amounts.

20 Claims, 6 Drawing Sheets

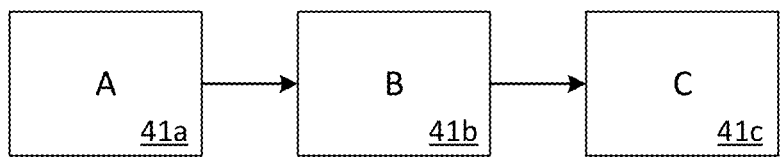
Fig. 4A
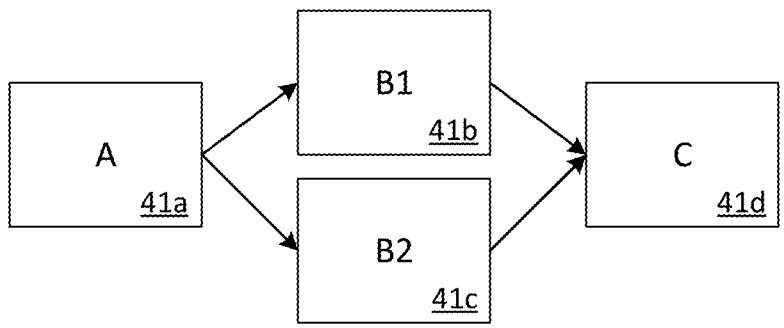
Fig. 4B
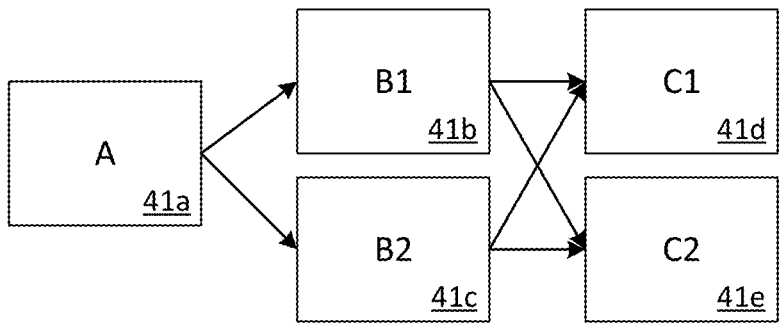
Fig. 4C
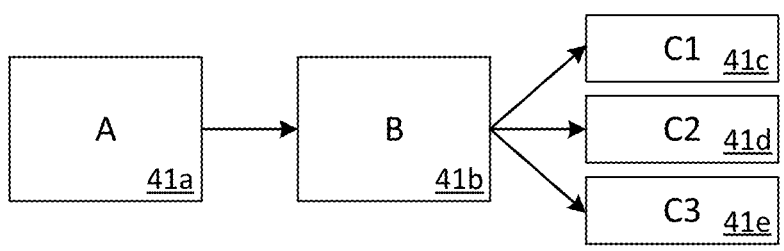
Fig. 4D
Fig. 4E

User interface 50

| Applications: | Dept. 1 | Dept. 2 | Dept. 3 | |
|---|---|---|---|---|
| Application A | ☒ | ☒ | ☒ | — action button 52 |
| Application B1 | ☑ | ☒ | ☒ | |
| Application B2 | ☑ | ☑ | ☑ | |
| Application C1 | ☑ | ☑ | ☒ | |
| Application C2 | ☑ | ☒ | ☑ | |

*Fig. 5A*

User interface 55

| Applications: | Level 1 | Level 2 | |
|---|---|---|---|
| Application A | ☑ | ☑ | — action button 53 |
| Application B | ☑ | ☑ | |
| Application C1 | ☑ | ☑ | |
| Application C2 | ☒ | ☑ | |
| Application C3 | ☑ | ☒ | |

SYSTEMS AND METHODS FOR DISTRIBUTION OF ENTERPRISE SOFTWARE AND COMPENSATION FOR USAGE OF THE ENTERPRISE SOFTWARE

FIELD OF THE DISCLOSURE

The present disclosure relates to systems and methods for distribution of enterprise software and compensation for usage of the enterprise software.

BACKGROUND

Distributing consumer software is known. Per-seat compensation for installation of consumer software is known.

SUMMARY

One aspect of the present disclosure relates to a system configured for distribution of enterprise software and compensation for usage of the enterprise software. The system may include electronic storage, one or more hardware processors, and/or other components. The electronic storage may be configured to store information. The information may include executable code of software applications, including a first software application, a second software application, a third software application, and a fourth software application. The one or more hardware processors may be configured by machine-readable instructions to receive first user input from a first administrative user. The first user input may represent entry and/or selection of a first subset of the software applications. Individual software applications in the first subset may be eligible to be used by a first subset of the users. The first administrative user may be responsible for the individual software applications that are made eligible to the first subset of the users. The first subset of the users may be organized under a first corporate client. The one or more hardware processors may be configured by machine-readable instructions to receive second user input from a second administrative user. The second user input may represent entry and/or selection of a second subset of the first subset of software applications. Individual software applications in the second subset may be eligible to be used by a second subset of the first subset of users. The second administrative user may be responsible for the individual software applications that are made eligible to the second subset of the first subset of users. The second subset of the first subset of users may be organized under an organizational subdivision of the first corporate client. The one or more hardware processors may be configured by machine-readable instructions to present, to the second subset of the first subset of users, the second subset of the first subset of software applications as eligible to be used within the organizational subdivision of the first corporate client. The one or more hardware processors may be configured by machine-readable instructions to receive third user input from the third user. The third input may represent entry and/or selection of the third software application for execution. The one or more hardware processors may be configured by machine-readable instructions to receive fourth user input from the fourth user. The fourth input may represent entry and/or selection of the fourth software application for execution. The one or more hardware processors may be configured by machine-readable instructions to facilitate the execution of the third software application for the third user. The one or more hardware processors may be configured by machine-readable instructions to facilitate the execution of the fourth software application for the fourth user. The one or more hardware processors may be configured by machine-readable instructions to monitor a first number of times the third software application is executed by individual users in the second subset of the first subset of users, including the third user. The one or more hardware processors may be configured by machine-readable instructions to monitor a second number of times the fourth software application is executed by individual users in the second subset of the first subset of users, including the fourth user. The one or more hardware processors may be configured by machine-readable instructions to determine a first compensation amount that corresponds to the first number of times as monitored. The one or more hardware processors may be configured by machine-readable instructions to determine a second compensation amount that corresponds to the second number of times as monitored. The one or more hardware processors may be configured by machine-readable instructions to present information to a given administrative user associated with one or both of the first corporate client or the organizational subdivision of the first corporate client. The information may include the determined first and second compensation amounts.

Another aspect of the present disclosure relates to a method for distribution of enterprise software and compensation for usage of the enterprise software. The enterprise software can be used by users. The users may include a first user, a second user, a third user, and a fourth user. The method may include storing information. The information may include executable code of software applications, including a first software application, a second software application, a third software application, a fourth software application, and/or other software applications. The method may include receiving first user input from a first administrative user. The first user input may represent entry and/or selection of a first subset of the software applications. Individual software applications in the first subset may be eligible to be used by a first subset of the users. The first administrative user may be responsible for the individual software applications that are made eligible to the first subset of the users. The first subset of the users may be organized under a first corporate client. The method may include receiving second user input from a second administrative user, wherein the second user input represents entry and/or selection of a second subset of the first subset of software applications. Individual software applications in the second subset may be eligible to be used by a second subset of the first subset of users. The second administrative user may be responsible for the individual software applications that are made eligible to the second subset of the first subset of users. The second subset of the first subset of users may be organized under an organizational subdivision of the first corporate client. The method may include presenting, to the second subset of the first subset of users, the second subset of the first subset of software applications as eligible to be used within the organizational subdivision of the first corporate client. The method may include receiving third user input from the third user. The third input may represent entry and/or selection of the third software application for execution. The method may include receiving fourth user input from the fourth user. The fourth input may represent entry and/or selection of the fourth software application for execution. The method may include facilitating the execution of the third software application for the third user. The method may include facilitating the execution of the fourth software application for the fourth user. The method may include monitoring a first number of times the third software application is executed by individual users in the second subset of the first subset of users, including the third user. The method may include monitoring a second number of times the fourth software application is executed by individual users in the second subset of the first subset of users, including the fourth user. The method may include determining a first compensation amount that corresponds to the first number of times as monitored. The method may include determining a second compensation amount that corresponds to the second number of times as monitored. The method may include presenting information to a given administrative user associated with one or both of the first corporate client or the organizational subdivision of the first corporate client. The information may include the determined first and second compensation amounts.

As used herein, any association (or relation, or reflection, or indication, or correspondency) involving servers, processors, client computing platforms, software applications, documents, formats, selections, presentations, extracted information, user interfaces, user interface elements, portions, fields, character sequences, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 4A-4B-4C-4D-4E illustrate exemplary software pipelines including multiple software applications, as may be used in a system configured for distribution of enterprise software and compensation for usage of the enterprise software, in accordance with one or more implementations.

FIGS. 5A-5B illustrate exemplary user interfaces as may be provided to facilitate distribution of enterprise software and compensation for usage of the enterprise software, in accordance with one or more implementations.

DETAILED DESCRIPTION

Figure 1:
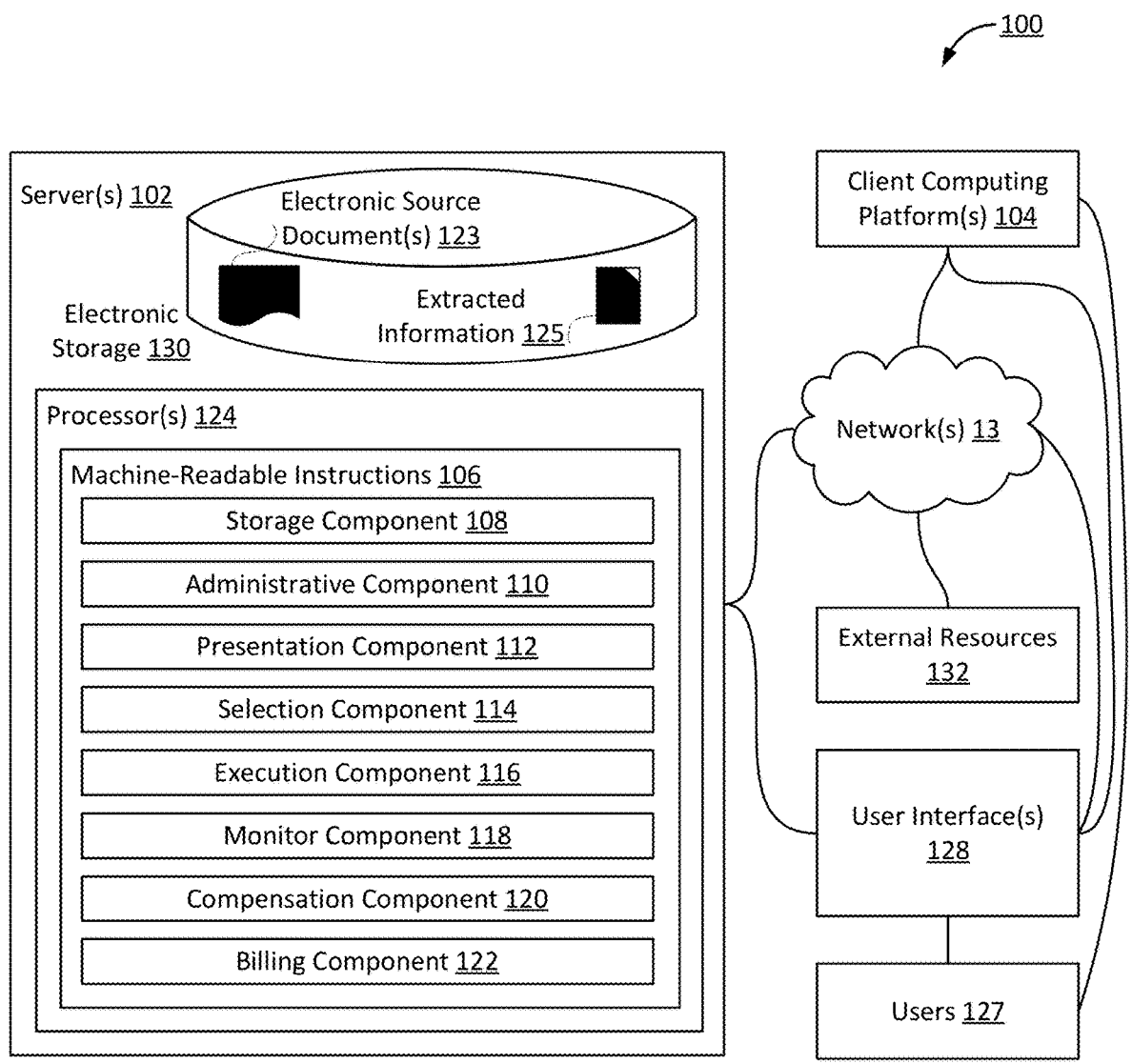
FIG. 1 illustrates a system configured for distribution of enterprise software and compensation for usage of the enterprise software, in accordance with one or more implementations.

FIG. 1 illustrates a system 100 configured for distribution of enterprise software and compensation for usage of the enterprise software, in accordance with one or more implementations. For consumer software, per-seat compensation for installation of the software on particular computing devices may be common, but this model and/or mechanism may not work well, or may not be adequate, accurate, and/or flexible enough for enterprise software. Enterprise software may be distributed among enterprises, corporate clients, and/or other groups of employees or other people interacting and/or working together. As used herein, a corporate client may refer to a group of people working together and/or sharing some responsibilities and/or goals as a group. For example, a corporate client may refer to a corporation, a company, a business, an enterprise, a government entity, a partnership, an organization, and/or another group of people working together and/or sharing some responsibilities and/or goals as a group. In some implementations, a corporate client may include and/or form a legal entity, or be associated with a legal entity.

As used herein, an instance of enterprise software may simply be referred to as a software application. In some implementations, software applications may include executable code of (machine-readable) instructions that may form a program. In some implementations, executable code and/or instructions may be executed by a processor to perform one or more particular features, tasks, and/or functionality. As used here, a processor is a machine and not a person. In some implementations, execution by a processor may include execution by a machine that is assisted, helped, controlled, managed, and/or otherwise jointly operated by a person. In some implementations, multiple software applications may be combined to form more elaborate software applications. For example, in some implementations, multiple software applications may be combined to form a pipeline of software applications. For example, in a pipeline, the output and/or result produced and/or generated by a first application may subsequently be used as input and/or source for a second application, and so forth. As used herein, individual components of a pipeline may be referred to as software applications, even if an individual component is merely configured to perform one or more particular tasks and/or functions. By way of non-limiting example, FIG. 4A illustrates an exemplary software pipeline 40a including multiple software applications, as may be used by system 100. As depicted, software pipeline 40a includes a software application 41a (labeled "A"), followed by a software application 41*b* (labeled "B"). For example, the output and/or result produced and/or generated by software application 41*a* may function as an input and/or source for software application 41*b*. This concept of software pipelines may be extended, e.g. as illustrated in FIG. 4B, depicting an exemplary software pipeline 40*b* including multiple software applications, as may be used by system 100. Software pipeline 40*b* includes a software application 41*a* (labeled "A"), followed by a software application 41*b* (labeled "B"), followed by a software application 41*c* (labeled "C"). In some implementations, software pipelines may include options and/or choices for one or more features, tasks, and/or a particular functionality of the software pipeline. By way of non-limiting example, FIG. 4C depicts an exemplary software pipeline 40*c* including multiple software applications, as may be used by system 100. Software pipeline 40*c* includes a software application 41*a* (labeled "A"), followed by either a software application 41*b* (labeled "B1") or a software application 41*c* (labeled "B2"), either of which may be followed by a software application 41*d* (labeled "C"). By way of non-limiting example, FIG. 4D depicts an exemplary software pipeline 40*d* including multiple software applications, as may be used by system 100. Software pipeline 40*d* includes a software application 41*a* (labeled "A"), followed by either a software application 41*b* (labeled "B1") or a software application 41*c* (labeled "B2"), either of which may be followed by either a software application 41*d* (labeled "C1") or a software application 41*e* (labeled "C2"). By way of non-limiting example, FIG. 4E depicts an exemplary software pipeline 40*e* including multiple software applications, as may be used by system 100. Software pipeline 40*e* includes a software application 41*a* (labeled "A"), followed by a software application 41*b* (labeled "B"), which may be followed by one of the following three options: a software application 41*c* (labeled "C1"), a software application 41*d* (labeled "C2"), or a software application 41*e* (labeled "C3").

Referring to FIG. 1, in some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. Users 127 may include a first user, a second user, a third user, a fourth user, and/or other users. One or more of users 127 may be administrative users, such as a first administrative user, a second administrative user, a third administrative user, and so forth. One or more of the administrative users may be responsible and/or accountable for individual software applications that are eligible to be used by one or more (other) users, in particular sets and/or subsets of users. In some implementations, one or more sets of users may be organized under one or more corporate clients. For example, a first set of users may be organized under a first corporate client, e.g. as the employees of the first corporate client. In some implementations, one or more sets of users may be organized under one or more organizational subdivisions of an individual corporate client. For example, a second set of users may be organized under a first subdivision of the first corporate client. As used herein, organizational subdivisions may be (based on) groups of employees (e.g., a research group, or the junior associates), departments (e.g., a compliance department), locations (e.g., the San Diego office), and/or other entities within corporate clients or legal entities.

In some implementations, an administrative user may be associated with one or more corporate clients and/or one or more organizational subdivisions of a corporate client.

In some implementations, individual ones of users 127 may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of storage component 108, administrative component 110, presentation component 112, selection component 114, execution component 116, monitor component 118, compensation component 120, billing component 122, and/or other instruction components.

Storage component 108 may be configured to electronically store information. In some implementations, storage component 108 may be configured to electronically store information in electronic storage 130. In some implementations, stored information may include executable code of software applications. In some implementations, stored information may include binary code to install software applications. In some implementations, stored information may include executable code to install software applications. The software applications may include a first software application, a second software application, a third software application, a fourth software application, and so forth. In some implementations, the software applications may be organized in different sets and/or subsets, which may in some cases overlap, or in some cases be mutually exclusive.

In some implementations, stored information may include one or more electronic source documents 123, extracted information 125, and/or other information. As used herein, documents may be referred to as "source documents" when the documents are originally published, generated, produced, communicated, and/or made available to users, or when the documents are copies thereof. Alternatively, and/or simultaneously, documents may be referred to as "source documents" when the documents are a source or a basis or a container for human-readable information. By way of non-limiting example, human-readable information may include characters and/or other information. In some implementations, characters may be grouped and/or otherwise organized into character sequences. By way of non-limiting example, such sequences may represent names, numbers, strings, and/or other information. As used herein, an electronic source document 123 may be an electronic version of a source document (e.g., a scanned and/or photographed version of an original paper document and/or otherwise physical original document, or a copy of an original digital document). By way of non-limiting example, the electronic format of an electronic source document 123 may be the Portable Document Format, or pdf. For example, a particular electronic source document 123 may represent a bank statement (see for example FIG. 3). For example, a particular electronic source document 123 may represent a financial record. For example, a particular electronic source document 123 may be a photocopy of a physical document from a government agency. For example, a particular electronic source document 123 may include and/or be a captured and/or generated image and/or video.

In some implementations, extracted information 125 may have been extracted and/or otherwise derived from documents, including but not limited to electronic source documents 123. As used herein, the term "extract" and its variants refer to the process of identifying and/or interpreting information that is included in a document, whether performed by determining, measuring, calculating, computing, estimating, approximating, interpreting, generating, and/or otherwise deriving the information, and/or any combination thereof. In some implementations, extracted information 125 may have a semantic meaning, including but not limited to opinions, judgement, classification, and/or other meaning that may be attributed to human interpretation. For example, in some implementations, extracted information 125 need not literally be included in a particular electronic source document, but may be a conclusion, classification, and/or other type of result of (human and/or machine-powered) interpretation of the contents of the particular electronic source document. In some implementations, extracted information 125 may have been extracted by a software application (or document analysis process) that includes optical character recognition (OCR). Alternatively, and/or simultaneously, in some implementations, extracted information 125 may have been extracted by a software application (or document analysis process) that uses machine-learning (in particular deep learning) techniques. For example, (deep learning-based) computer vision technology may have been used. For example, a convolutional neural network may have been trained and used to classify (pixelated) image data as characters, and/or other types of information. In some implementations, extracted information 125 may have been extracted by a software application (or document analysis process) that uses a pipeline of steps (or software applications) for object detection, object recognition, and/or object classification. In some implementations, extracted information 125 may have been extracted by a software application (or document analysis process) that uses one or more of rule-based systems, regular expressions, deterministic extraction methods, stochastic extraction methods, and/or other techniques. In some implementations, particular document analysis processes that were used to extract extracted information 125 may fall outside of the scope of this disclosure, and the results of these particular document analysis processes, e.g., extracted information 125, may be stored in electronic storage 130.

In some implementations, extracted information 125 may include one or more sets of character sequences. By way of non-limiting example, such sequences may represent names, numbers, strings, and/or other information. In some implementations, extracted information 125 may include meta-information regarding individual ones of the characters or character sequences. By way of non-limiting example, the meta-information regarding an individual of the character sequences may include one or more of font type, font size, font weight, font color, typographical emphasis (e.g., italic, bold, etc.), letter case, capitalization, margins, alignment, spacing, and/or other meta-information. In some implementations, the meta-information may further include indications of levels of confidence in the reliability of the document analysis process used to extract particular extracted information. For example, the meta-information of an extracted character sequence may include an indication of the level of confidence (as determined by the document analysis process itself) in the accuracy of the results. For example, the meta-information of an extracted character sequence may include an indication of reliability (as determined by the document analysis process itself) of the results. For example, the meta-information of an extracted character sequence may include an indication of the level of accuracy (as determined by the document analysis process itself) of the results. In some implementations, the meta-information of an item of extracted information may represent a level of confidence of a machine-learning technique and/or rule-based technique used in a particular document analysis process. In some implementations, the meta-information of an item of extracted information 125 may represent a sentiment attributed to some or all of electronic source document 123. In some implementations, one or more of these indications may be represented by low, medium, or high levels. In some implementations, one or more of these indications may be represented, from low to high, by red, yellow, or green levels. In some implementations, one or more of these indications may be represented by numerical values between, say, 0 and 100, with 100 being the highest level (of confidence, reliability, accuracy, and/or other quality indications).

Figure 3:
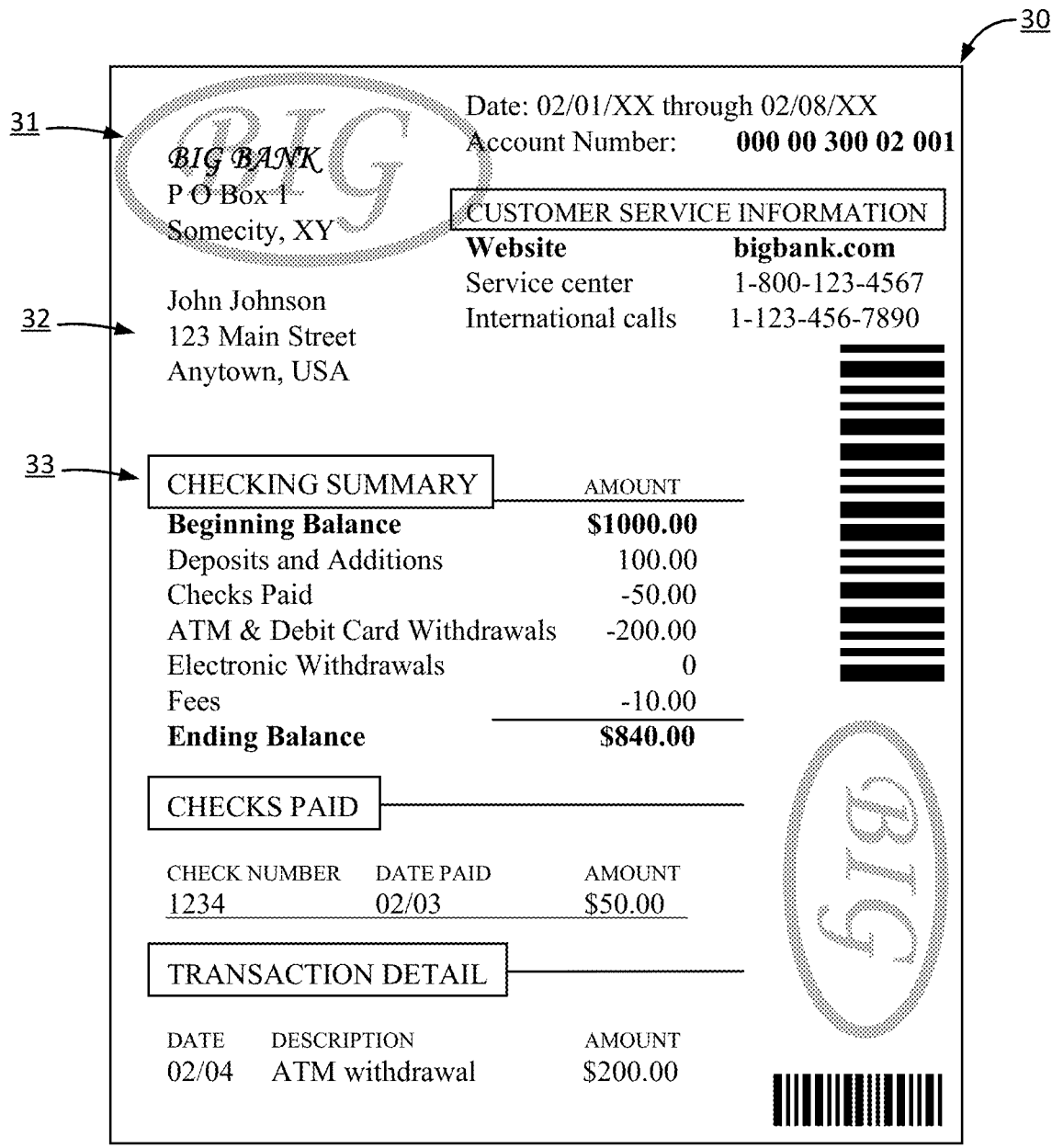
FIG. 3 illustrates an exemplary electronic document as may be used in a system configured for distribution of enterprise software and compensation for usage of the enterprise software, in accordance with one or more implementations.

By way of non-limiting example, FIG. 3 illustrates an exemplary electronic source document 30 as may be used in system 100 (of FIG. 1), in accordance with one or more implementations. Exemplary electronic source document 30 may represent a bank statement from a particular bank, intended for a particular account holder, regarding a particular account of the particular account holder with the particular bank. The bank statement may include various familiar elements, such as, by way of non-limiting example, the bank's name, address, and logo of the bank as indicated by an indicator 31, an account holder's name and address as indicated by an indicator 32, an overview of checking account information (including, for example, beginning account balance for a particular period and ending account balance for the particular period) as indicated by an indicator 33, and other familiar elements of a bank statement.

Referring to FIG. 3, given extracted information that is extracted from exemplary electronic source document 30 may include one or more of the familiar elements discussed above, including but not limited to the bank's name, the account holder's name and address, elements from the overview of checking account information, and/or other elements. For example, the given extracted information may include the combination of "account holder's name" and "John Johnson." As depicted here, the character sequence "John Johnson" may be interpreted as "account holder's name," even though the latter is not literally included in exemplary electronic source document 30. For example, the given extracted information may include the combination of "Account Number" and "000 00 300 02 001." As depicted here, both these character sequences may be literally included in exemplary electronic source document 30.

Referring to FIG. 1, administrative component 110 may be configured to receive user input from users 127, e.g., through user interfaces 128. For example, administrative component 110 may be configured to receive user input from one or more administrative users. In some implementations, received user input may represent entry and/or selection of one or more software applications. In some implementations, received user input may represent entry and/or selection of one or more sets and/or subsets of software applications. For example, a selected set of software applications may be eligible to be installed and/or used to one or more users (e.g., a set and/or subset of users 127). In some implementations, administrative users may be responsible and/or accountable for individual software applications that are made eligible to one or more users. In some implementations, administrative users may be responsible and/or accountable for individual software applications that are installed and/or made installable to one or more users. In some implementations, administrative users may be responsible and/or accountable for individual software applications that are made usable and/or executable to one or more users. In some implementations, a group, set, and/or subset of users 127 may be organized under a given corporate client. In some implementations, a group, set, and/or subset of users 127 may be organized under a given organization subdivision of a given corporate client.

For example, administrative component 110 may be configured to receive user input from a first administrative user regarding a first set of software applications that are eligible to used and/or executed by a first set of users (under a first corporate client). For example, administrative component 110 may be configured to receive user input from a second administrative user regarding a subset of the first set of software applications that are eligible to used and/or executed by a subset of the first set of users (under a first organizational subdivision of the first corporate client). For example, users in the first set may be eligible to use a first software application or a second software application, but not a third software application. For example, in some implementations, users in the subset of the first set of users may have a broader availability of software applications (e.g., they may use not only the first software application or the second software application, but also the third software application). Alternatively, in some implementations, users in the subset of the first set of users may have a narrower availability of software applications (e.g., they may use only the first software application, and not the second or third software application). In some implementations, user input from an individual user 127 may be received through a user interface (e.g., presented on a client computing platform 104). In some implementations, user input from an individual user 127 may be received through an electronic document and/or file, such as, e.g., a configuration file.

By way of non-limiting example, FIG. 5A illustrates an exemplary user interface 50 as may be presented and/or provided to a given administrative user responsible and/or accountable for individual software applications that are made eligible to the users of different organizational subdivisions (e.g., as depicted, three different departments of a given corporate client). As depicted, the available software applications for this given corporate client include applications A-B1-B2-C1-C2, and the three different departments under the responsibility of the given administrative user include department 1 (labeled "Dept. 1"), department 2 (labeled "Dept. 2"), and department 3 (labeled "Dept. 3"). For example, these available software applications may be used to form a software pipeline similar to software pipeline 40d in FIG. 4D. Through graphical user interface elements, including but not limited to action button 52 (which may toggle between active and inactive), the given administrative user may provide user input that represents entering and/or selecting which different software applications are eligible for execution and/or usage by the users of each of the different departments. For example, as depicted, users of none of the three departments can currently select application A for execution. For example, as depicted, users of all of the three departments can select application B2 for execution. The other applications are partially available to the users of these departments, as depicted.

Referring to FIG. 1, presentation component 112 may be configured to present user interfaces 128 to users 127. In some implementations, presentation component 112 may be configured to present software applications as eligible to be executed and/or used by users 127. In some implementations, a presented user interface 128 may facilitate entry and/or selection by users 127 of one or more software applications to be used by users 127. For example, in reference to exemplary user interface 50 of FIG. 5A, users 127 organized under department 1 may be presented with a given user interface depicting only the column for their department (and not department 2 or department 3), and only the eligible software applications (here, applications B1-B2-C1-C2, excluding application A). In such a given user interface, action buttons similar to action button 52 may be used to launch an individual software application (here, selected from application B1-B2-C1-C2).

Referring to FIG. 1, selection component 114 may be configured to receive user input from users 127. In some implementations, received user input may represent entry and/or selection of one or more software applications for execution and/or usage by users 127. In some implementations, user input from an individual user may be received through an individual user interface. In some implementations, user input from an individual user may be received through an electronic document and/or file, such as, e.g., a configuration file.

Execution component 116 may be configured to execute and/or launch software applications for users 127. In some implementations, execution component 116 may be configured to facilitate execution and/or launching of one or more software applications, e.g., for individual ones of users 127 (e.g., on individual client computing platforms 104 associated with the individual users). In some implementations, operation of execution component 116 may be in accordance with received user input (e.g., as received by selection component 114 and/or other components of system 100).

Monitor component 118 may be configured to monitor execution and/or usage of software applications by users 127. In some implementations, monitor component 118 may be configured to monitor the number of times individual software applications are executed, launched, and/or otherwise used by individual ones of users 127. In some implementations, monitoring by monitor component 118 may make a distinction between billable usage and non-billable usage. For example, merely opening and closing a given software application without producing and/or generating any output or result may, in some implementations, be classified as non-billable usage, and accordingly not counted in the monitored number of times a given software application is used under billable usage. In some implementations, usage may be deemed billable usage after a given software application has been open and/or active for at least a predetermine minimum duration, such as 5 seconds, 10 seconds, 1 minute, 5 minutes, 10 minutes, and/or another duration. In some implementations, billable usage may be counted and/or accounted in predetermined units of time, such as 10-minute increments, 15-minute increments, 30-minute increments, 1-hour increments, 2-hour increments, 4-hour increments, 8-hour increments, and/or other units of time. For example, 90 continuous minutes of usage may be deemed as two units of 1-hour usage. In some implementations, usage may be deemed billable usage only after producing and/or generating any output or result. In some implementations, individual outputs or results may be counted as the monitored number of times a given software application has been executed. In other words, monitored execution and/or usage by monitor component 118 is not based on per-seat installation of software applications. Rather, in some implementation, actual and/or billable usage of individual software applications is monitored by monitor component 118.

By way of non-limiting example, FIG. 5B illustrates an exemplary user interface 55 as may be presented and/or provided to a given administrative user responsible and/or accountable for individual software applications that are made eligible to the users of different organizational subdivisions (e.g., as depicted, two different sets of users of a given corporate client, referred to as "Level 1" and "Level 2"). The individual software applications may form a software application pipeline similar to software pipeline 40*e* in FIG. 4E. As depicted, the available software applications for this given corporate client include applications A-B-C1-C2-C3. Through graphical user interface elements, including but not limited to action button 53 (which may toggle between active and inactive), the given administrative user may provide user input that represents entering and/or selecting which different software applications are eligible for execution and/or usage by the users of each of the different sets of users. For example, as depicted, users of Level 1 can select Application C1 or C3 for execution, but not Application C2. For example, as depicted, users of Level 2 can select Application C1 or Application C2 for execution, but not Application C3.

Referring to FIG. 1, compensation component 120 may be configured to determine compensations and/or compensation amounts, e.g., for execution and/or usage of software applications. In some implementations, compensation component 120 may be configured to determine compensation amounts for the number of times one or more given software applications have been executed and/or used by one or more given users 127. In some implementations, determinations by compensation component 120 may be based on information from monitor component 118. In some implementations, determinations by compensation component 120 may be limited to billable usage. In some implementations, determinations by compensation component 120 may be aggregated for multiple individual users and/or for multiple individual software applications. In some implementations, at least some part of a given compensation amount (as determined by compensation component 120 based on billable usage of certain software applications by the users of a given corporate client) may be payable to an external organization that is external to the given corporate client. In some implementations, at least some part of a given compensation amount (as determined by compensation component 120 based on billable usage of certain software applications by the users of a given organizational subdivision of a particular corporate client) may be payable to a particular organizational subdivision of the particular corporate client that is different from the given organizational subdivision. For example, users 127 in a compliance department of a particular corporate client may execute a particular software application that has been developed by a research group in the same particular corporate client. Accordingly, at least some part of the determined compensation amount for billable usage of the particular software application by the users in the compliance department may be payable to the research group (in other words, the research group may be the payee). Having a payee internal to a corporate client may be referred to as internal billing, or cross-billing.

For example, in some implementations, a given set of users of a given corporate client may use a software application pipeline similar to software pipeline 40*c* in FIG. 4C, to process electronic documents similar to electronic source document 30 depicted in FIG. 3. In this example, software application 41*b* may include OCR functionality provided by a first external organization (such that the external organization is a first external payee for this given corporate client), and software application 41*c* may include OCR functionality provided by a second external organization (such that the second external organization is a second external payee for this given corporate client, which may be different from the first external payee). In some implementations, the individual users may select between using software application 41*b* and software application 41*c*. In this example, software application 41*d* may include functionality to create and populate records (or fields in records) based on OCR'd input, and this functionality may be provided by an organization subdivision, such as the research department, of this given corporate client (such that the research department is a first internal payee for this given corporate client). Determined compensation amounts for the first external payee may correspond to the monitored billable usage of software application 41*b*. Determined compensation amounts for the second external payee may correspond to the monitored billable usage of software application 41*c*. Determined compensation amounts for the first internal payee may correspond to the monitored billable usage of software application 41*d*.

As another example, in some implementations, a given set of users of a given corporate client may use a software application pipeline similar to software pipeline 40*d* in FIG. 4D, to process electronic documents similar to electronic source document 30 depicted in FIG. 3. In this example, software application 41*b* may include functionality to extract a street address from electronic source documents, and software application 41*b* may be provided by an external organization (such that the external organization is an external payee for this given corporate client), and software application 41*c* may include similar address-finding functionality provided by an organization subdivision, such as the research department, of this given corporate client (such that the research department is a first internal payee for this given corporate client). In some implementations, the individual users may select between using software application 41*b* and software application 41*c*. In some implementations, users of a particular department may be limited in their choice to either software application 41*b* or software application 41*c*. In this example, software application 41*d* may include functionality to perform a basic level of integrity verification between different fields, records, and/or documents. For example, an address extracted from a document may be matched and/or verified against a previously stored address, or against an address extracted from a driver's license. Software application 41*d* may be provided by an organization subdivision, such as the compliance department, of this given corporate client (such that the compliance department is a second internal payee for this given corporate client). Software application 41*e* may include similar functionality for identity verification as software application 41*d*. Software application 41*e* may be provided by an organization subdivision, such as the research department. In some implementations, the individual users may select between using software application 41*d* and software application 41*e*. In some implementations, users of a particular department may be limited in their choice to either software application 41*d* or software application 41*e*. Determined compensation amounts for the external payee may correspond to the monitored billable usage of software application 41*b*. Determined compensation amounts for the first internal payee may correspond to the monitored billable usage of software application 41c and software application 41e. Determined compensation amounts for the second internal payee may correspond to the monitored billable usage of software application 41d.

Figure 6:
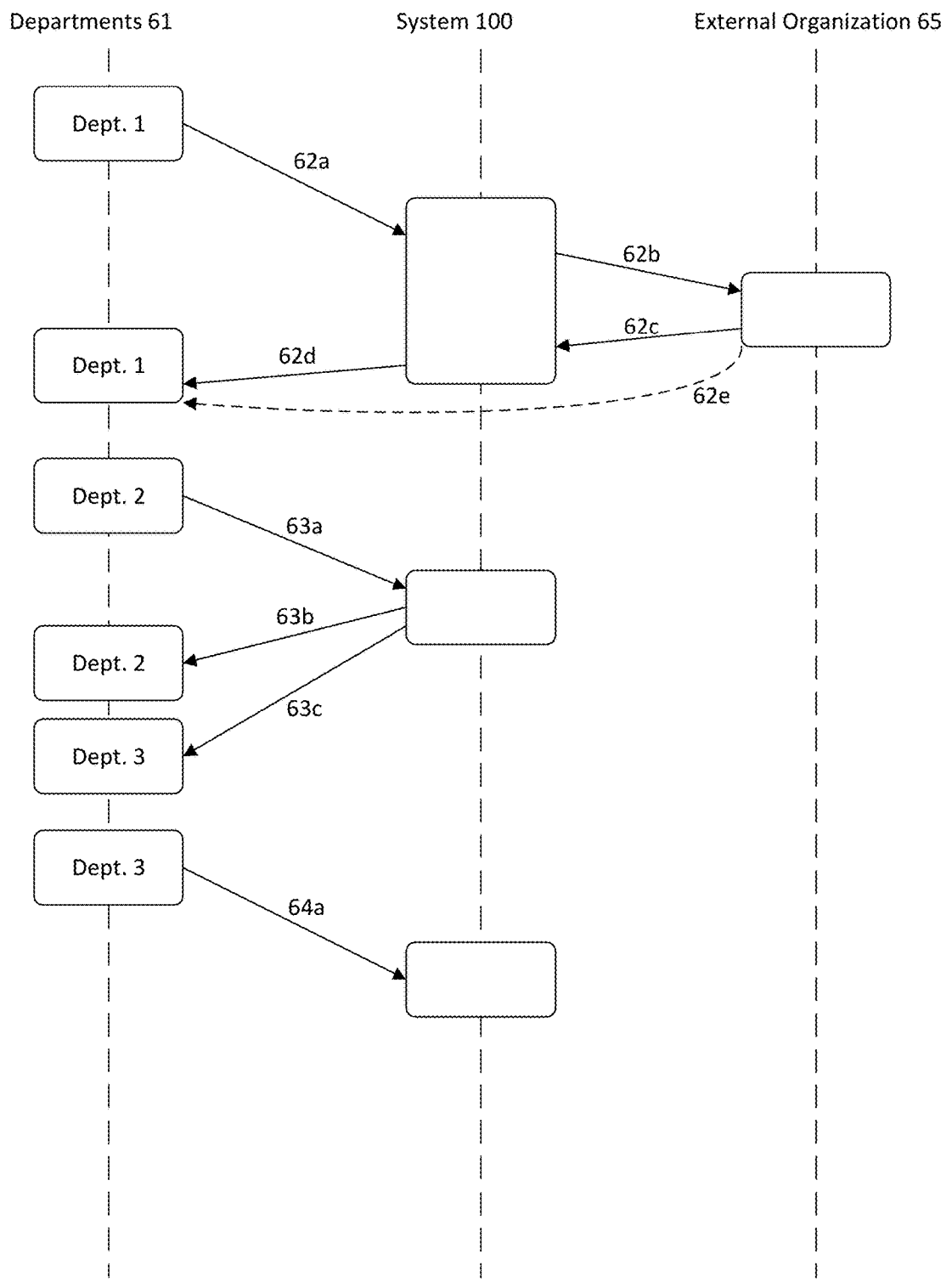
FIG. 6 illustrates an exemplary transactional diagram depicting transactions and/or events as may occur in a system configured for distribution of enterprise software and compensation for usage of the enterprise software, in accordance with one or more implementations.

To elaborate on this example, the given set of users of the given corporate client may use a software application pipeline similar to software pipeline 40d in FIG. 4D, to process electronic documents similar to electronic source document 30 depicted in FIG. 3 (as described above), in accordance with input provided by a given administrative user through a user interface similar to exemplary user interface 50 depicted in FIG. 5A. As depicted, the available software applications for this given corporate client include applications A-B1-B2-C1-C2, and the three different departments under the responsibility of the given administrative user include a first department (labeled "Dept. 1"), a second department (labeled "Dept. 2", which may be the compliance department, or the second internal payee in this example), and a third department (labeled "Dept. 3", which may be the research department, or the first internal payee in this example). In this example, software application 41b (or "B1") is provided by external organization 65 (in FIG. 6), software applications 41c (or "B2") and 41e (or "C2") are provided by the research department (or "Dept. 3"), and software application 41d (or "C1") is provided by the compliance department (or "Dept. 2"). Accordingly, based on user interface 50, users in the first department may select and/or execute applications B1-B2-C1-C2, users in the second department may select and/or execute applications B2-C1, and users in the third department may select and/or execute applications B2-C2. Transactions and/or other events as described in this example may be illustrated in FIG. 6, which depicts an exemplary transactional diagram 60 between departments 61 (including "Dept. 1", "Dept. 2", "Dept. 3"), system 100, and an external organization (which provided software application 41b in software pipeline 40d of FIG. 4D). A transaction 62a represents actions by users in the first department (selecting and executing software applications as described, which may be monitored by system 100), a transaction 63a represents similar actions by users in the second department, and a transaction 64a represents similar actions by users in the third department. A transaction 62b may represent the portion of actions in transaction 62a that are provided by external organization 65 (here, this may be related to usage of software application 41b). In some implementations, system 100 may determine compensation amounts (e.g., for the external payee or external organization 65, the first internal payee or research department, and the second internal payee or compliance department), and notify the first department through a transaction 62d (e.g., through an invoice). Alternatively, external organization 65 may provide information to system 100 through a transaction 62c regarding one or more compensation amounts (e.g., through an invoice), which may be relayed through transaction 62d. Alternatively, external organization 65 may provide information to the first department through a transaction 62e (e.g., through an invoice). The invoice reaching the first department may include (i) billable usage of software application 41b, payable to external organization 65, (ii) billable usage of software applications 41c and 41e, payable to the research department, a.k.a. "Dept. 3", and (iii) billable usage of software application 41d, payable to the compliance department, a.k.a. "Dept. 2". Subsequent to transaction 63a, a transaction 63b to the compliance department may represent the portion of actions in transactions 63a that are provided by and payable to the research department ("Dept. 3") (here, this may be related to usage of software application 41c or "B2", because presumably usage of software application 41d or "C1" would be free to users of the compliance department itself). A transaction 63c to the research department may notify the research department of the invoice transmitted and/or provided to the compliance department, in accordance with transaction 63b. Lastly, transaction 64a may represent actions selected, executed, and provided by the research department. Presumably, usage of software applications 41c and 41e would be free to users of the research department itself.

As another example, in some implementations, a given set of users of a given corporate client may use a software application pipeline similar to software pipeline 40e in FIG. 4E, to process loan applications. In this example, software application 41c may include functionality to perform a basic level of identity verification of the person applying for a loan. Software application 41b may be provided by an external organization (such that the external organization is an external payee for this given corporate client). Software application 41d may include a more rigorous and/or elaborate process (but still automated) for performing identity verification, and may be provided by a first organization subdivision, such as the compliance department, of this given corporate client (such that the compliance department is a first internal payee for this given corporate client). Software application 41e may include the most rigorous and elaborate available process (e.g., including in-person human verification of employment history of the person applying for the loan) for performing identity verification, and may be provided by a second organization subdivision, such as the employment verification department, of this given corporate client (such that the employment verification department is a second internal payee for this given corporate client). In some implementations, the individual users may select between using software application 41c, software application 41d, or software application 41e. Determined compensation amounts for the external payee may correspond to the monitored billable usage of software application 41c. Determined compensation amounts for the first internal payee may correspond to the monitored billable usage of software application 41d. Determined compensation amounts for the second internal payee may correspond to the monitored billable usage of software application 41e (and may include compensation amounts that correspond to the in-person human verification of employment history of the person applying for the loan).

Referring to FIG. 1, billing component 122 may be configured to present information to users 127, including but not limited to administrative users. In some implementations, the presented information may be based on one or more determinations by compensation component 120. For example, billing component 122 may be configured to present billing information and/or invoice information to an administrative user associated with a given corporate client such that the presented information is based on determined compensations amounts (determined by compensation component 120). In some implementations, the presented information may be specific to individual organizational subdivisions of a given corporate client. In some implementations, presentations by billing component 122 may occur on regular and/or predetermined intervals, such as weekly, monthly, and/or other intervals and/or durations.

In some implementations, server(s) 102, client computing platform(s) 104, and/or external resources 132 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users and client computing platforms 104. For example, user interfaces 128 may provide an interface through which users 127 may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 132 may include sources of information outside of system 100, external entities participating with system 100, and/or other resources. In some implementations, external resources 132 may include a provider of documents, including but not limited to electronic source documents 123, on which system 100 and/or its components may operate. In some implementations, external resources 132 may include a provider of information, including but not limited to extracted information 125, on which system 100 and/or its components may operate. In some implementations, some or all of the functionality attributed herein to external resources 132 may be provided by resources included in system 100.

Server(s) 102 may include electronic storage 130, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, 118, 120, and/or 122, and/or other components. Processor(s) 124 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, and/or any other components.

It should be appreciated that although components 108, 110, 112, 114, 116, 118, 120, and/or 122 are illustrated in FIG. 1 as being implemented within a single processing unit, in implementations in which processor(s) 124 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 124 may be configured to execute one or more additional components that may perform some or all of the functionality attributed below to one of components 108, 110, 112, 114, 116, 118, 120, and/or 122.

Figure 2:
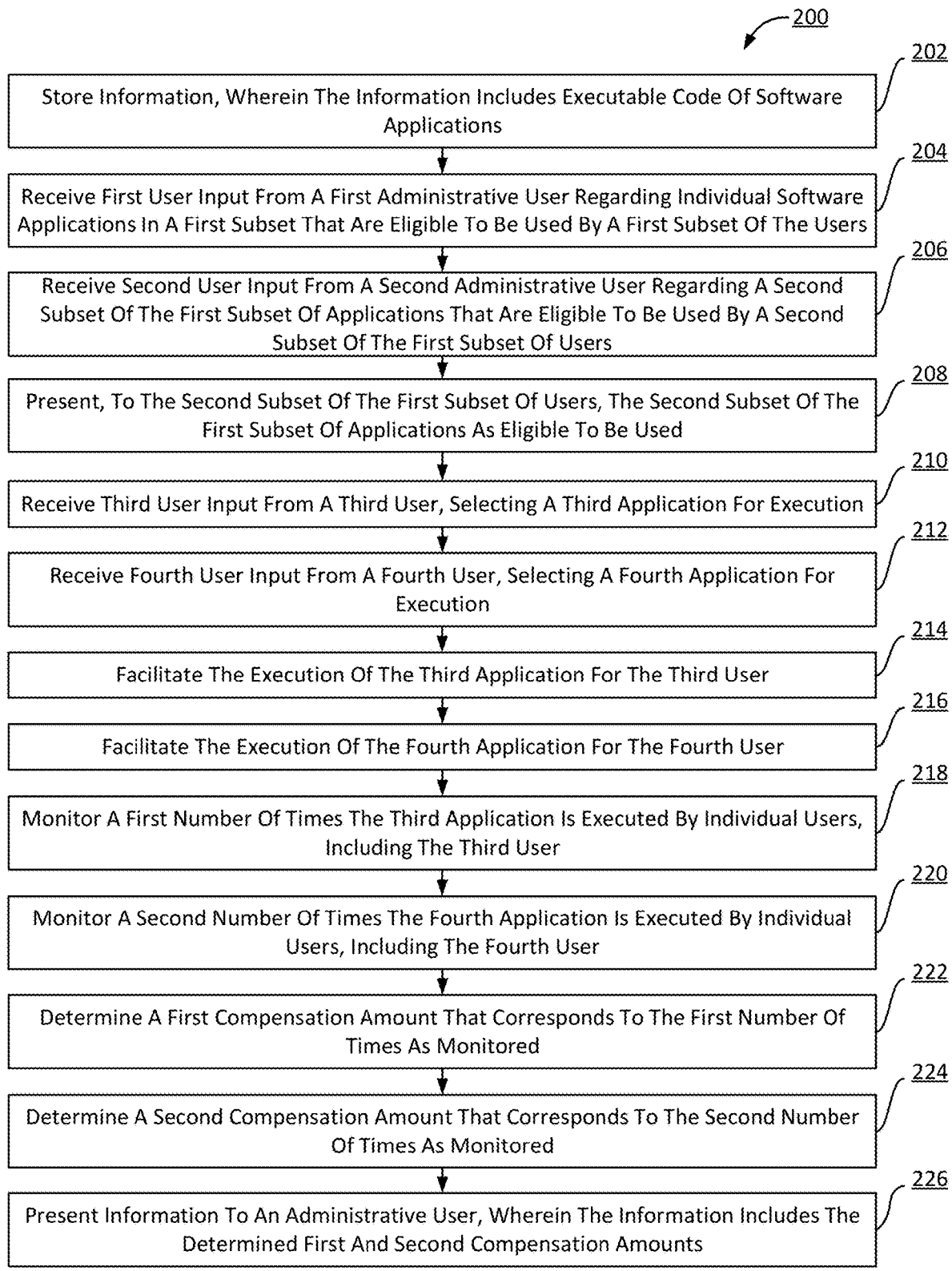
FIG. 2 illustrates a method for distribution of enterprise software and compensation for usage of the enterprise software, in accordance with one or more implementations.

FIG. 2 illustrates a method 200 for distribution of enterprise software and compensation for usage of the enterprise software, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing information. The information includes executable code of software applications, including a first software application, a second software application, a third software application, and a fourth software application. In some embodiments, operation 202 is performed by a storage component and/or electronic storage the same as or similar to storage component 108 and/or electronic storage 130 (shown in FIG. 1 and described herein).

An operation 204 may include receiving first user input from a first administrative user. The first user input represents entry and/or selection of a first subset of the software applications. Individual software applications in the first subset are eligible to be used by a first subset of the users. The first administrative user is responsible for the individual software applications that are made eligible to the first subset of the users. The first subset of the users are organized under a first corporate client. In some embodiments, operation 204 is performed by an administrative component the same as or similar to administrative component 110 (shown in FIG. 1 and described herein).

An operation 206 may include receiving second user input from a second administrative user. The second user input represents entry and/or selection of a second subset of the first subset of software applications. Individual software applications in the second subset are eligible to be used by a second subset of the first subset of users. The second administrative user is responsible for the individual software applications that are made eligible to the second subset of the first subset of users. The second subset of the first subset of users are organized under an organizational subdivision of the first corporate client. In some embodiments, operation 206 is performed by an administrative component the same as or similar to administrative component 110 (shown in FIG. 1 and described herein).

An operation 208 may include presenting, to the second subset of the first subset of users, the second subset of the first subset of software applications as eligible to be used within the organizational subdivision of the first corporate client. In some embodiments, operation 208 is performed by a presentation component the same as or similar to presentation component 112 (shown in FIG. 1 and described herein).

An operation 210 may include receiving third user input from the third user. The third input represents entry and/or selection of the third software application for execution. In some embodiments, operation 210 is performed by a selection component the same as or similar to selection component 114 (shown in FIG. 1 and described herein).

An operation 212 may include receiving fourth user input from the fourth user. The fourth input represents entry and/or selection of the fourth software application for execution. In some embodiments, operation 212 is performed by a selection component the same as or similar to selection component 114 (shown in FIG. 1 and described herein).

An operation 214 may include facilitating the execution of the third software application for the third user. In some embodiments, operation 214 is performed by an execution component the same as or similar to execution component 116 (shown in FIG. 1 and described herein).

An operation 216 may include facilitating the execution of the fourth software application for the fourth user. In some embodiments, operation 216 is performed by an execution component the same as or similar to execution component 116 (shown in FIG. 1 and described herein).

An operation 218 may include monitoring a first number of times the third software application is executed by individual users in the second subset of the first subset of users, including the third user. In some embodiments, operation 218 is performed by a monitor component the same as or similar to monitor component 118 (shown in FIG. 1 and described herein).

An operation 220 may include monitoring a second number of times the fourth software application is executed by individual users in the second subset of the first subset of users, including the fourth user. In some embodiments, operation 220 is performed by a monitor component the same as or similar to monitor component 118 (shown in FIG. 1 and described herein).

An operation 222 may include determining a first compensation amount that corresponds to the first number of times as monitored. In some embodiments, operation 222 is performed by a compensation component the same as or similar to compensation component 120 (shown in FIG. 1 and described herein).

An operation 224 may include determining a second compensation amount that corresponds to the second number of times as monitored. In some embodiments, operation 224 is performed by a compensation component the same as or similar to compensation component 120 (shown in FIG. 1 and described herein).

An operation 226 may include presenting information to a given administrative user associated with one or both of the first corporate client or the organizational subdivision of the first corporate client. The information includes the determined first and second compensation amounts. In some embodiments, operation 226 is performed by a billing component the same as or similar to billing component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for distribution of enterprise software and compensation for usage of the enterprise software, wherein the enterprise software can be used by users, wherein the users include a first user, a second user, a third user, and a fourth user, the system comprising:

electronic storage configured to store information, wherein the information includes executable code of software applications, including a first software application, a second software application, a third software application, and a fourth software application;

one or more hardware processors configured by machine-readable instructions to:

receive first user input from a first administrative user, wherein the first user input represents entry and/or selection of a first subset of the software applications, wherein individual software applications in the first subset are eligible to be used by a first subset of the users, wherein the first administrative user is responsible for the individual software applications that are made eligible to the first subset of the users, wherein the first subset of the users are organized under a first corporate client;

receive second user input from a second administrative user, wherein the second user input represents entry and/or selection of a second subset of the first subset of software applications, wherein individual software applications in the second subset are eligible to be used by a second subset of the first subset of users, wherein the second administrative user is responsible for the individual software applications that are made eligible to the second subset of the first subset of users, wherein the second subset of the first subset of users are organized under an organizational subdivision of the first corporate client;

present, to the second subset of the first subset of users, the second subset of the first subset of software applications as eligible to be used within the organizational subdivision of the first corporate client receive third user input from the third user, wherein the third input represents entry and/or selection of the third software application for execution;

receive fourth user input from the fourth user, wherein the fourth input represents entry and/or selection of the fourth software application for execution;

facilitate the execution of the third software application for the third user;

facilitate the execution of the fourth software application for the fourth user;

monitor a first number of times the third software application is executed by individual users in the second subset of the first subset of users, including the third user;

monitor a second number of times the fourth software application is executed by individual users in the second subset of the first subset of users, including the fourth user;

determine a first compensation amount that corresponds to the first number of times as monitored;

determine a second compensation amount that corresponds to the second number of times as monitored; and present information to a given administrative user associated with one or both of the first corporate client or the organizational subdivision of the first corporate client, wherein the information includes the determined first and second compensation amounts.

2. The system of claim 1, wherein at least some part of the first compensation amount is payable to a second organizational subdivision of the first corporate client.

3. The system of claim 1, wherein at least some part of the first compensation amount is payable to an external organization that is external to the first corporate client.

4. The system of claim 3, wherein at least some part of the second compensation amount is payable to a second external organization that is external to the first corporate client, wherein the second external organization is different from the external organization.

5. The system of claim 1, wherein the first subset of the software applications excludes the first software application, and includes the second, third, and fourth software applications, and wherein the first subset of users excludes the first user, and includes the second, third, and fourth users.

6. The system of claim 1, wherein the second subset of the first subset of the software applications excludes the second software application, and includes the third and fourth software applications, and wherein the second subset of the first subset of users excludes the second user, and includes the third and fourth users.

7. The system of claim 1, wherein presenting the second subset of the first subset of software applications includes presenting a fifth software application and a sixth software application as eligible to be used within the organization subdivision of the first corporate client, wherein billable execution of the fifth software application is monitored and associated with an internal payee, wherein billable execution of the sixth software application is monitored and associated with an external payee, wherein the execution of the third software application either includes execution of the fifth software application or execution of the sixth software application in a pipelined fashion.

8. The system of claim 7, wherein selection of including either the execution of the fifth software application or the execution of the sixth software application in the pipelined fashion is made by the individual users in the second subset of the first subset of users.

9. The system of claim 7, wherein a first part of the first compensation amount is payable to the internal payee based on an amount of the billable execution of the fifth software application, and a second part of the first compensation amount is payable to the external payee based on an amount of the billable execution of the sixth software application.

10. The system of claim 1, wherein the external payee is external to the organizational subdivision of the first corporate client, but internal to the first corporate client.

11. A method for distribution of enterprise software and compensation for usage of the enterprise software, wherein the enterprise software can be used by users, wherein the users include a first user, a second user, a third user, and a fourth user, the method comprising:

storing information, wherein the information includes executable code of software applications, including a first software application, a second software application, a third software application, and a fourth software application;

receiving first user input from a first administrative user, wherein the first user input represents entry and/or selection of a first subset of the software applications, wherein individual software applications in the first subset are eligible to be used by a first subset of the users, wherein the first administrative user is responsible for the individual software applications that are made eligible to the first subset of the users, wherein the first subset of the users are organized under a first corporate client;

receiving second user input from a second administrative user, wherein the second user input represents entry and/or selection of a second subset of the first subset of software applications, wherein individual software applications in the second subset are eligible to be used by a second subset of the first subset of users, wherein the second administrative user is responsible for the individual software applications that are made eligible to the second subset of the first subset of users, wherein the second subset of the first subset of users are organized under an organizational subdivision of the first corporate client;

presenting, to the second subset of the first subset of users, the second subset of the first subset of software applications as eligible to be used within the organizational subdivision of the first corporate client;

receiving third user input from the third user, wherein the third input represents entry and/or selection of the third software application for execution;

receiving fourth user input from the fourth user, wherein the fourth input represents entry and/or selection of the fourth software application for execution;

facilitating the execution of the third software application for the third user;

facilitating the execution of the fourth software application for the fourth user;

monitoring a first number of times the third software application is executed by individual users in the second subset of the first subset of users, including the third user;

monitoring a second number of times the fourth software application is executed by individual users in the second subset of the first subset of users, including the fourth user;

determining a first compensation amount that corresponds to the first number of times as monitored;

determining a second compensation amount that corresponds to the second number of times as monitored; and presenting information to a given administrative user associated with one or both of the first corporate client or the organizational subdivision of the first corporate client, wherein the information includes the determined first and second compensation amounts.

12. The method of claim 11, wherein at least some part of the first compensation amount is payable to a second organizational subdivision of the first corporate client.

13. The method of claim 11, wherein at least some part of the first compensation amount is payable to an external organization that is external to the first corporate client.

14. The method of claim 13, wherein at least some part of the second compensation amount is payable to a second external organization that is external to the first corporate client, wherein the second external organization is different from the external organization.

15. The method of claim 11, wherein the first subset of the software applications excludes the first software application, and includes the second, third, and fourth software applications, and wherein the first subset of users excludes the first user, and includes the second, third, and fourth users.

16. The method of claim 11, wherein the second subset of the first subset of the software applications excludes the second software application, and includes the third and fourth software applications, and wherein the second subset of the first subset of users excludes the second user, and includes the third and fourth users.

17. The method of claim 11, wherein presenting the second subset of the first subset of software applications includes presenting a fifth software application and a sixth software application as eligible to be used within the organization subdivision of the first corporate client, wherein billable execution of the fifth software application is monitored and associated with an internal payee, wherein billable execution of the sixth software application is monitored and associated with an external payee, wherein the execution of the third software application either includes execution of the fifth software application or execution of the sixth software application in a pipelined fashion.

18. The method of claim 17, further comprising selecting either the execution of the fifth software application or the execution of the sixth software application in the pipelined fashion, wherein the selection is made by the individual users in the second subset of the first subset of users.

19. The method of claim 17, wherein a first part of the first compensation amount is payable to the internal payee based on an amount of the billable execution of the fifth software application, and a second part of the first compensation amount is payable to the external payee based on an amount of the billable execution of the sixth software application.

20. The method of claim 11, wherein the external payee is external to the organizational subdivision of the first corporate client, but internal to the first corporate client.

* * * * *

UNITED STATES PATENT AND TRADEMARK OFFICE
CERTIFICATE OF CORRECTION

Page 1 of 1

PATENT NO. : 10,878,467 B1
APPLICATION NO. : 16/940919
DATED : December 29, 2020
INVENTOR(S) : Anant Bhardwaj et al.

It is certified that error appears in the above-identified patent and that said Letters Patent is hereby corrected as shown below:

On the Title Page

Item (72) Inventors should read:
Anant Bhardwaj, San Francisco, CA (US)
Shih Ping Chang, San Francisco, CA (US)
Justin Herlick, San Francisco, CA (US)
Karthikeyan Sabhanatarajan, San Francisco CA (US)
Mohit Chawla, San Francisco, CA (US)

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*